United States Patent [19]
Edwards et al.

[11] Patent Number: 5,938,876
[45] Date of Patent: Aug. 17, 1999

[54] METHOD OF MAKING EYEGLASS LENSES WITH ADD ON SEGMENTS

[75] Inventors: John L. Edwards, Sarasota, Fla.;
Robert J. Morrison, Harrisburg, Pa.

[73] Assignee: Morrison International, Inc., Sarasota, Fla.

[21] Appl. No.: 09/014,143

[22] Filed: Jan. 27, 1998

Related U.S. Application Data

[60] Provisional application No. 60/036,629, Jan. 31, 1997.

[51] Int. Cl.$^6$ .............................. B32B 31/24; G02C 7/02
[52] U.S. Cl. ..................... 156/99; 156/245; 156/273.7; 156/275.5; 156/307.1; 351/159; 351/166
[58] Field of Search ............................ 156/99, 102, 212, 156/214, 228, 245, 273.7, 275.5, 307.1; 264/1.7, 1.8, 2.7; 351/159, 166, 172, 177

[56] References Cited

U.S. PATENT DOCUMENTS

| | | |
|---|---|---|
| 4,859,261 | 8/1989 | Ace ......................................... 156/102 |
| 4,975,328 | 12/1990 | Hirose et al. .............................. 264/1.7 |
| 5,508,205 | 4/1996 | Dominguez et al. ...................... 156/99 |
| 5,531,940 | 7/1996 | Gupta et al. .............................. 264/1.7 |

*Primary Examiner*—Michael W. Ball
*Assistant Examiner*—Michael A Tolin
*Attorney, Agent, or Firm*—Harris Beach & Wilcox, LLP.

[57] ABSTRACT

In order to enable ophthalmic (eyeglass) lenses with add-on lens segments to be produced economically so as, for example, to provide a multi-focal addition to a base single lens and dispensed to a user, the add on segment is molded from a liquid photopolymer and partially cured to a state where it is elastomeric (a gel which holds its shape). The segment is then located upon a surface of the base lens which acts as a substrate where the base lens which acts as a substrate and conforms to the surface even if the surface has special corrective curvature as for astigmatism. The base lens may be a conventional plastic lens (acrylic or polycarbonate). No additional adhesive is required. When in place the curing of the segment is completed so that the multi-focal lens with the segment adhering to the base lens is produced.

5 Claims, 5 Drawing Sheets

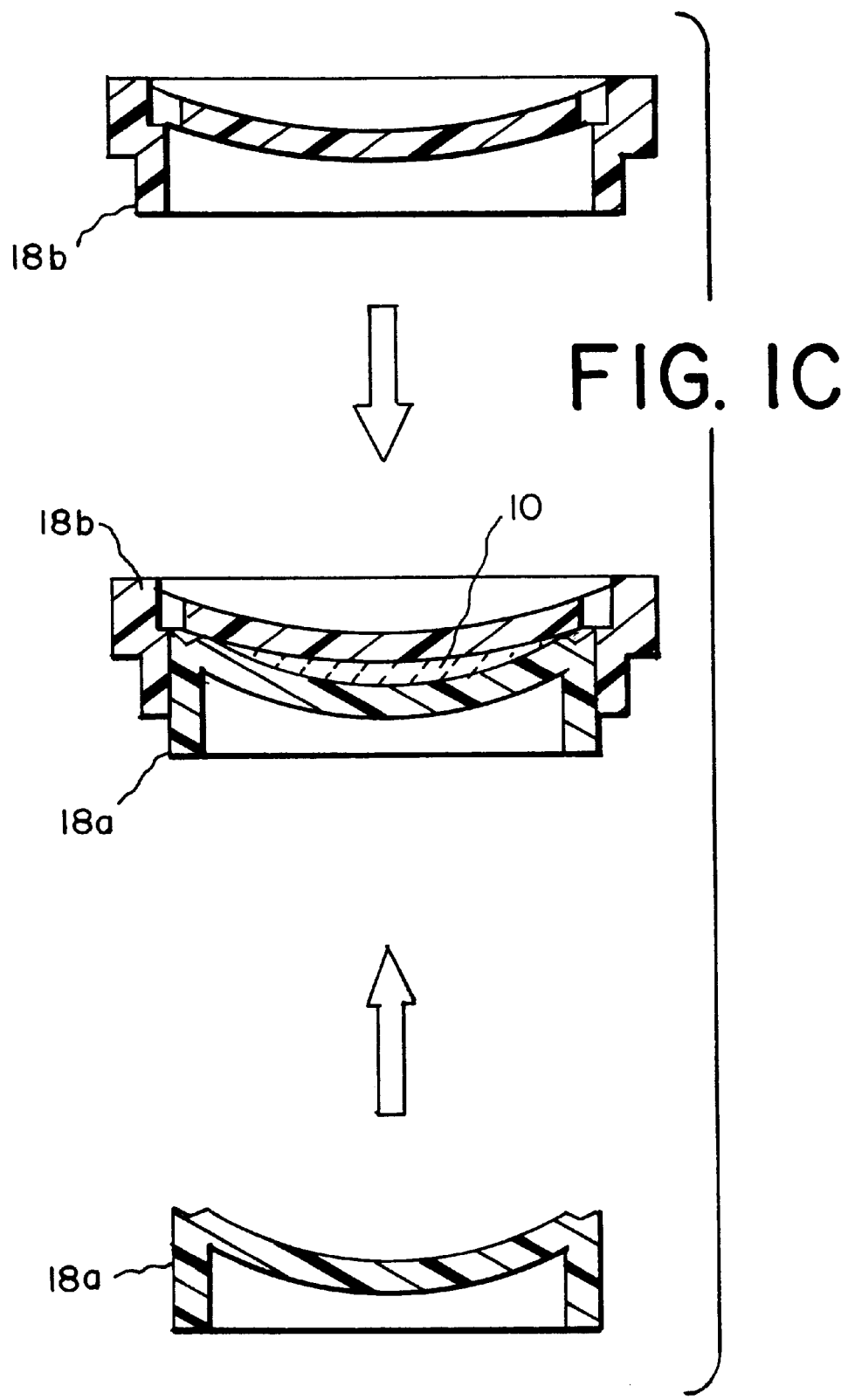

METHOD OF MAKING EYEGLASS LENSES WITH ADD ON SEGMENTS

The application claims the priority benefit of my provisional application Ser. No. 60/036,627, filed Jan. 31, 1997.

DESCRIPTION

The present invention relates to a method for fabricating and attaching a thin lens segment to a base refracting eyeglass lens to give the base lens bifocal or multi-focal capability, and more particularly, lens segments fabricated simply, economically and applied to the substrate base lens during the original dispensing of eyeglasses to the patient.

Typically, in the past the task of adding a bifocal, trifocal or other multi-focal capability to a base eyeglass lens was performed by skilled labor using job specific machinery, either in a factory setting or in an ophthalmic laboratory, and specialized semi-finished lenses which have the add power molded into the front surface but must have the back surface ground and surfaced to the patient's custom prescription. Such laboratories might be an independent wholesale processing laboratory or located adjacent to an eye care practitioner's office location or encompassed by an optical retail outlet, primarily large optical chain stores. Such specialized semi-finished molded lenses, equipment and labor, by their very nature, are quite expensive and add time delay and material movement costs to end user, which is the patient, and the cost of eyeglasses with multi-focal lenses may be 50% more expensive than glasses of the same frame style fitted only with single vision. Examples of such composite lenses as proposed heretofore are shown in Ace, 4,781,452 issued Nov. 1, 1988; NIX, 5,153,619, issued Oct. 6, 1992; and Burns 5,478,824, issued Dec. 26, 1995.

In many instances, the patient cannot afford the basic needs and, therefore, cannot afford to purchase expensive corrective eye wear. As a significant portion of the cost of producing eye wear lenses is controlled by the expense of procuring and operating job dedicated equipments, operated by skilled labor, transporting the materials to the optical laboratory for such fabrication, and by the associated expenditures of factories or laboratories dedicated to producing such custom made eye wear lenses, it is evident that a more effective means of cost control and a more convenient availability of such product for the customer are needed.

Therefore, it is a principal feature of the invention to provide a simple, economical method of fabricating a multi-focal addition to a base single vision lens so that it can be attached and dispensed quickly to the customer, based upon his specific prescription requirements, at the point-of-sale in a single transaction.

It is a further feature of the invention to provide an improved method of manufacturing bifocal lenses by permanently attaching a supplementary power lens segment to the finished base single vision lens once they have been fitted to the frames and the customer's face all at the point-of-sale.

A still further feature of the invention is to provide an improved method of manufacturing astigmatic lenses by permanently attaching a cylindrical power lens segment to the back (or front) of the semi-finished base single vision lens, thereby avoiding the need to have the back surface of the base lens ground and surfaced.

A still further feature of the invention is to provide a means of manufacturing component eyeglass lenses which avoids the step of needing to have an outside laboratory modify the base lens to make it multi-focal or cylindrical, which outside processing step is time consuming and costly.

The foregoing and other objects, features and advantages of the invention will become more apparent from reading the following description with the accompanying drawings, wherein FIGS. 1 A & B are side view of a two part casting assembly molding different molding fixtures.

FIG. 1 C schematically illustrates the molding fixtures respectively and assembled to form the casting carrier.

FIG. 2 A & B are respectfully an exploded perspective and front view of the casting carrier.

Figure 1A:
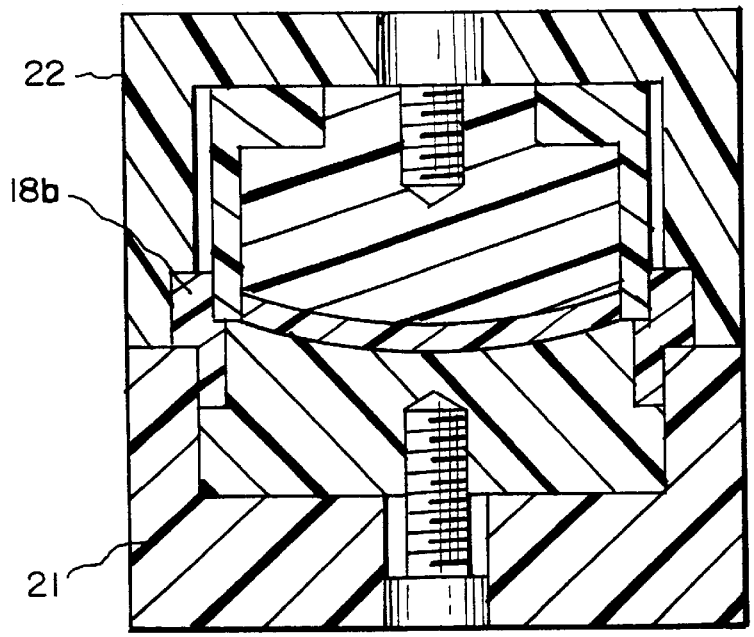
Figure 1B:
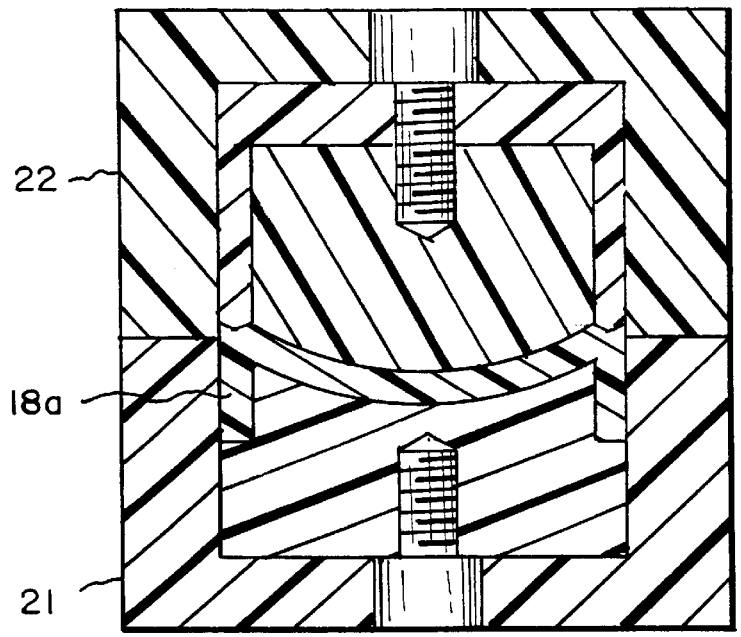

Refer more particularly to FIG. 1 which is a side view of the fabrication by injection molding of a two part urethane material casting sub-assembly 18a and b. The injection molds 21 and 22 with mold parts 20a & 20b with different inserts are designed to form the two part, male and female molding fixtures, 18a & b, which are used to cast the add-on power lens segment 10 and to also serve as a carrier subassembly. The two halves 18a & b of the casting carrier are injection molded such that they present an optical curvature of a radius such that certain combinations of male and female mating halves will yield a lens segment of cured copolymer with a predictable refractive power. The copolymer for molding the segment 10 may be a mercapto ester which is a liquid, UV (ultra-violet)light curable photopolymer. Generally, the liquid uncured material may be a resin, resinoid, polymer, cellulose derative, casein material or a protein. Specifically, Norland optical adhesive #61 from Norland Corp. in New Brunswick, N.J. USA may be used.

Figure 2B:
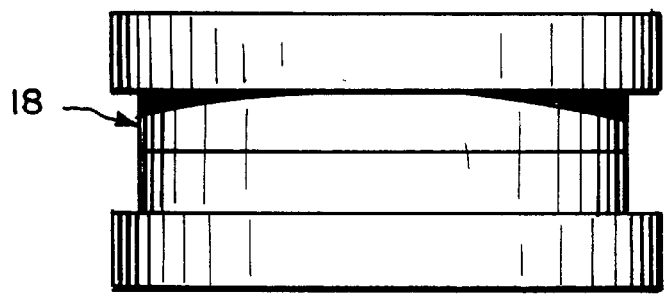
Figure 2A:
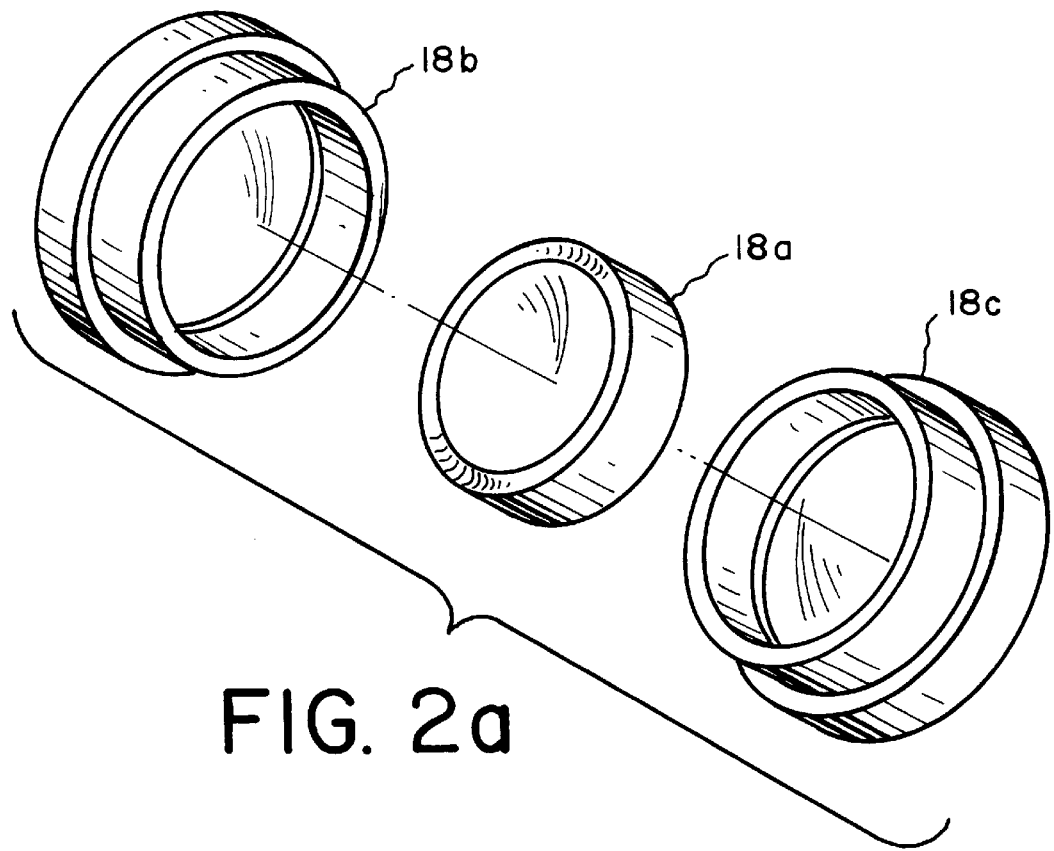

Refer more particularly to FIGS. 2a & 2b which are respectively a perspective view and a front view of the casting carrier 18. The carrier components 18a b and c provide the casting carrier 18. The uncured, liquid lens segment polymer is placed between the two mating optical surfaces of the subassembly components 18a &18b. Another female half of the casting carrier which is identical to 18b, herein designated as 18c, may be combined with assembled 18a and b to fit over the exposed bottom of component 18a to construct a symmetrical casting carrier which can be used for precuring and shipment. In another variation, component 18a can be molded to present an optical curvature on both ends, wherein two lens segments can be precured at each end of the casting carrier assembly. FIG. 2b shows the assembled casting carrier 18.

Figure 3:
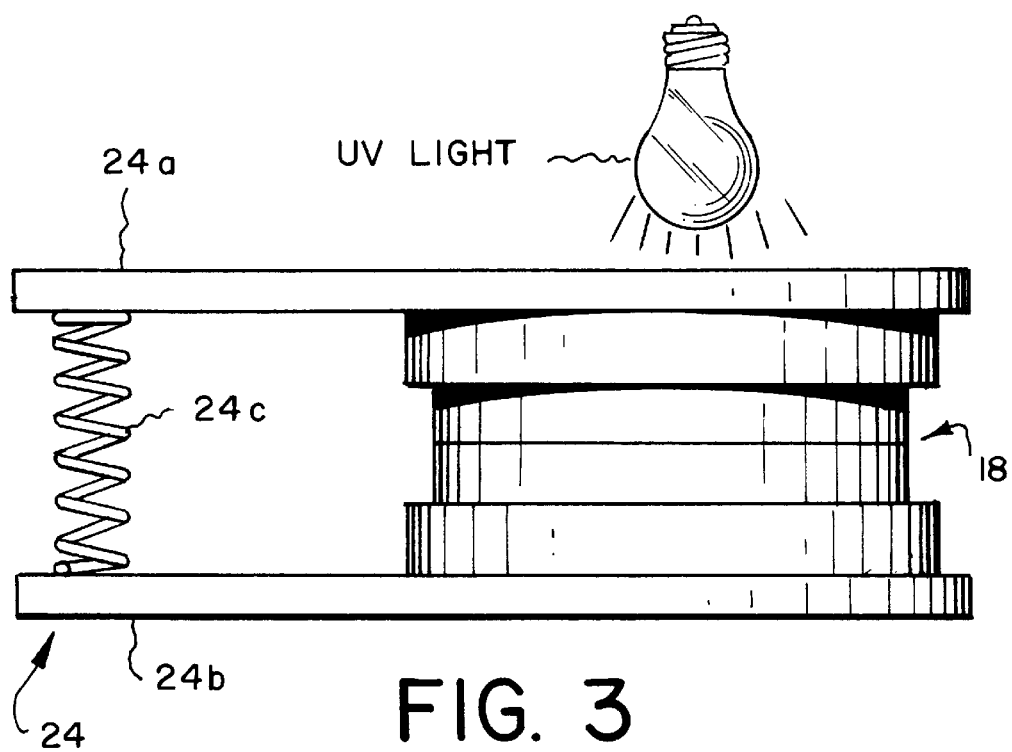
FIG. 3 is a diagnostic view of the casting carrier in a clamping fixture.

Refer more particularly to FIG. 3 which is a front view showing the assembled casting carrier 18 is placed in the holding fixture 24. The fixture 24 has two clamp parts 24a and b of clear or transparent plastic (urethane), which may be clear plastic discs, connected by spring clamp 24c. The casting carrier 18 held in the fixture 24 during precuring by clamp 24c.

FIG. 3 also shows the polymer contained in the casting container being partially cured (precured) by photo initiation, suitably for about 10 seconds to an elastomer (or gel) intermediate state. The exposure time and energy delivered to the casting container can vary with the polymer material.

Figure 4:
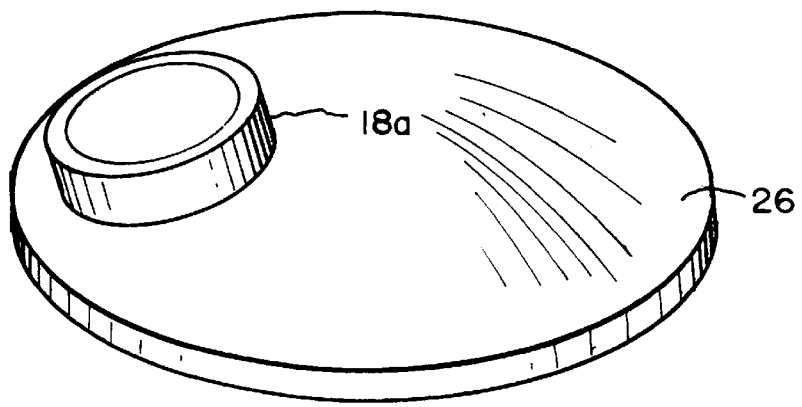
FIG. 4 shows a step in the method of the invention being carried out.

Refer more particularly to FIG. 4 which shows the step of the method of this invention after removing the female side 18b of the casting carrier assembly 16 and the peripheral flash of the casting which provides the lens segment 10. The rear concave surface of the add-on segment can be placed at the correct geometric location of the substrate, base lens 26 at the correct astigmatic angle according to the patient's prescription and facial parameters. Since the segment is in an elastomer or gel state it conforms to any surface radius of curvature, special cylinders, aspheres or other corrective surfaces of the base lens 26. Also, adherence can occur by pressure and with or without optical adhesives, thereby further reducing fabrication cost. Once properly positioned, the lens segment, with male casting carrier side 18a still attached can be cured by ultra violet irradiation, temperature or other initiator to bond the segment to the substrate. Full cure say for 6 minutes under UV light cures the segment 10 to attach and adhere the segment and provide a unitary multi-focal lens. The male casting container end 18a can be dislodged before or after cure by application of side pressure to the sides of the male carrier.

Figure 5:
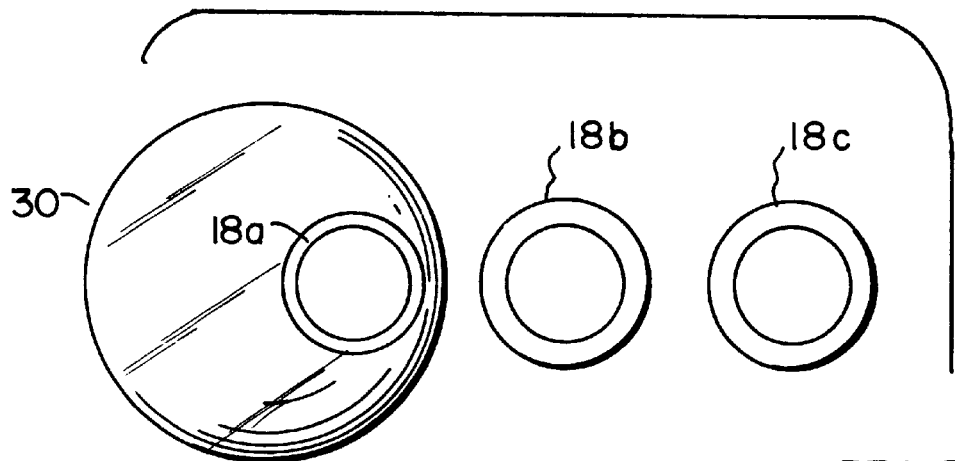
FIG. 5 shows a step in the method of the invention being carried out.
Figure 5:
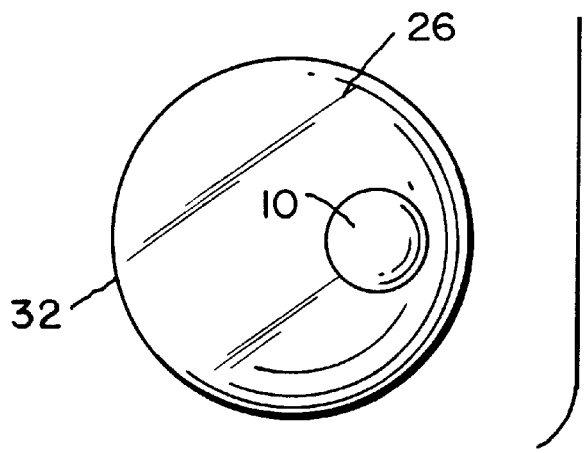

Refer more particularly to FIG. 5 which shows at 30 the precured segment 10 located on the surface of the base lens 26, while still in the male carrier part 18a, and adhering to the substrate 26 when the male casting carrier 18a is separated from the segment 10. The multi-focal lens is completed as shown at 32. If a photo initiator polymeric adhesive material is used to make the segment 10 and that material is inhibited by the presence of oxygen for polymerization, peripheral adhesive in the knife edge of the add segment will be uncured after the precure step with clamped container shown on FIG. 3, and can be wiped off after adherence to the base lens 26 as shown in FIG. 4 and before a final cure step preferably in an oxygen absent (nitrogen) chamber without male fixture part 18a still being attached to the segment. To fabricate lenses with aspheres (cylinders), the segment may be a corrective cylinder. Segments can be adhered and cured simultaneously on opposite surfaces of base lens 26.

Variations and modifications in the herein described method, within the scope of the invention, will undoubtedly suggest themselves to those skilled in the art. The foregoing is description should be taken as illustrative and not in a limiting sense.

We claim:

1. A method of making eyeglass lenses which comprises the steps of precuring a polymeric liquid material to provide an add-on lens segment in elastomeric or gel state, locating the segment on a surface of a substrate lens and applying sufficient pressure to adhere the segment thereto, and fully curing the add-on segment thereby adhering it permanently and securely where located on the substrate lens.

2. The method of claim 1 where said material is a mercaptoester.

3. The method of claim 1 where said precuring step is carried out by casting said material in a fixture, then partially curing said material to provide said segment in the elastomer or gel state.

4. The method of claim 3 wherein said fixture is held in a container, the step of partially curing the material comprises subjecting said material to wavelengths of curing energy and said container and fixture are sufficiently optically transparent at the wavelengths of curing energy to which said material is disposed.

5. The method of claim 1 where said precuring step is carried out in a fixture having a plurality of parts, and said locating step is carried out with the precured segment in one of said parts, and said part is removed after said fully curing step.

* * * * *